United States Patent [19]

Tadokoro et al.

[11] 3,893,824

[45] July 8, 1975

[54] FERROMAGNETIC THIN FILMS BY ELECTROPLATING

[75] Inventors: Eiichi Tadokoro; Masashi Aonuma; Tatsuji Kitamoto, all of Kanagawa, Japan

[73] Assignee: Fuji Photo Film Co., Ltd., Ashigara Japan

[22] Filed: Oct. 3, 1973

[21] Appl. No.: 403,295

[30] Foreign Application Priority Data

Oct. 3, 1972 Japan ................................ 47-99226

[52] U.S. Cl. ...................... 29/194; 29/197; 29/199; 75/170; 204/44; 340/174 NA

[51] Int. Cl. ......................... B23p 3/00; G11c 11/02

[58] Field of Search ........... 204/44; 75/170; 29/197, 29/199, 194; 340/174 NA; 148/100

[56] References Cited

FOREIGN PATENTS OR APPLICATIONS

| | | | |
|---|---|---|---|
| 951,208 | 3/1964 | United Kingdom | 75/170 |
| 295,690 | 3/1954 | Switzerland | 204/44 |

*Primary Examiner*—G. L. Kaplan
*Attorney, Agent, or Firm*—Sughrue, Rothwell, Mion, Zinn and Macpeak

[57] ABSTRACT

The magnetic properties of a cobalt-nickel alloy type ferromagnetic thin layer for magnetic recording produced by electroplating are improved by adding copper and zinc together to the thin layer.

6 Claims, 4 Drawing Figures

FERROMAGNETIC THIN FILMS BY ELECTROPLATING

BACKGROUND OF THE INVENTION

1. Field of the Invention

The present invention relates to a ferromagnetic layer prepared by electroplating and, more particularly, it relates to a cobalt-nickel alloy type ferromagnetic thin layer having improved magnetic properties prepared by electroplating.

2. Description of the Prior Art

In the field of magnetic recording, an important concern has been to increase the recording density, and with the object of improving magnetic recording mediums, investigations on recording systems as well as investigations on recording and reproducing means have been made. The present invention is concerned in an improvement in magnetic recording mediums among the aforesaid various approaches.

As for the properties required for magnetic recording mediums among the various magnetic properties required for increasing the magnetic recording density, there are coercive force (Hc), a squareness ratio, that is the ratio (Br/Bm) of the residual magnetic flux density (Br) to the maximum magnetic flux density (Bm) in the B-H curve of a magnetic substance, and the gradient ($\Delta B/\Delta H$) of the B-H curve. It is best that the coercive force be as high as possible, the squareness ratio be near 1.0, and the gradient be as large as possible.

Furthermore, when considering the recording mechanism in using a magnetic substance as a recording medium, it has been thought that the magnetic layer preferably should be as thin as possible for increasing the recording density due to problems of demagnetization field, etc.

In order to increase the recording density of magnetic recording mediums, improvement in the magnetic properties such as the coercive force, the squareness ratio, and the gradient of the B-H curve as described above has been investigated and further a recording medium in which a ferromagnetic powder is coated on a support has usually been employed. Recently, as disclosed in U.S. Pat. Nos. 2,791,515 and 3,516,860 a ferromagnetic thin layer formed by electrolytic plating, nonelectrolytic plating, vacuum deposition, sputtering, etc., which facilitates the formation of thin ferromagnetic layers has been developed.

The present invention relates to an improvement in a recording medium capable of increasing the recording density by use of electroplating of the above-described processes.

A ferromagnetic thin layer produced by electroplating has hitherto been prepared by depositing electrolytically on a support one or more of iron, cobalt, and nickel in a plating bath containing one or more of the above metals as metal ions.

It is already known that of the electroplated ferromagnetic thin layers containing iron, cobalt, nickel, etc., the most suitable layer satisfying the various properties for improving the recording density is a cobalt-nickel type co-deposited layer.

For example, in the Co—Ni type ferromagnetic thin layer, the Hc is about 250 Oe and the Br/Bm is about 0.7 and also the Co—Ni—Cu type ferromagnetic layer as disclosed in Japanese Pat. NO. 5301/1966 with a similar technique being disclosed in U.S. Pat. No. 3,471,272, the Hc is about 350 and the Br/Bm is about 0.7. However, for further increasing the magnetic recording density and utilizing sufficiently the magnetic properties of the electroplated ferromagnetic layer, it is desirable that the Br/Bm ratio be higher, preferably, higher than 0.8.

However, since the magnetic properties of such a co-deposited cobalt-nickel type ferromagnetic layer are insufficient for further improving the recording density which has been recently desired, an improvement in the cobalt-nickel type ferromagnetic layer has been made.

As described above, these improvements have been made with regard to magnetic properties such as the coercive force (Hc), the squareness ratio (Br/Bm), and the gradient of B-H curve.

For example, improvement has been attempted by incorporating other materials in a cobalt-nickel type ferromagnetic layer or by changing the manner in which the electric current used for plating is passed. However, it is difficult to improve all of the properties of the coercive force, the squareness ratio, and the gradient of the B-H curve by incorporating other materials in a cobalt-nickel type ferromagnetic layer by depositing them together at electroplating and in general it is quite difficult to improve both the coercive force and the squareness ratio of a ferromagnetic layer where the ferromagnetic layer is produced by electroplating. Therefore, in order to improve the magnetic properties of a cobalt-nickel type ferromagnetic thin layer by the addition of other materials, the additives become quite important. Various investigations have hitherto been conducted on additives such as copper, silver, mercury, neodymium, etc., but, although the Hc is improved, the improvement of the Br/Bm ratio is not as marked with the employment of such additives.

The inventors have, accordingly, investigated various additives for the purpose and have succeeded in making a cobalt-nickel type ferromagnetic thin layer having quite excellent magnetic properties.

SUMMARY OF THE INVENTION

An object of this invention is to provide an electroplated cobalt-nickel type ferromagnetic thin layer for magnetic recording having improved properties for increasing the recording density.

That is, according to this invention there is provided an electroplated ferromagnetic thin layer of a cobalt-nickel alloy type in which the ferromagnetic thin layer contains copper and zinc together.

BRIEF DESCRIPTION OF THE ACCOMPANYING DRAWINGS

FIGS. 1 – 4 are graphical presentations of the magnetic properties (Hc,Br/Bm) of the ferromagnetic thin layers produced in Examples 1 to 4.

DETAILED DESCRIPTION OF THE INVENTION

Figure 2:
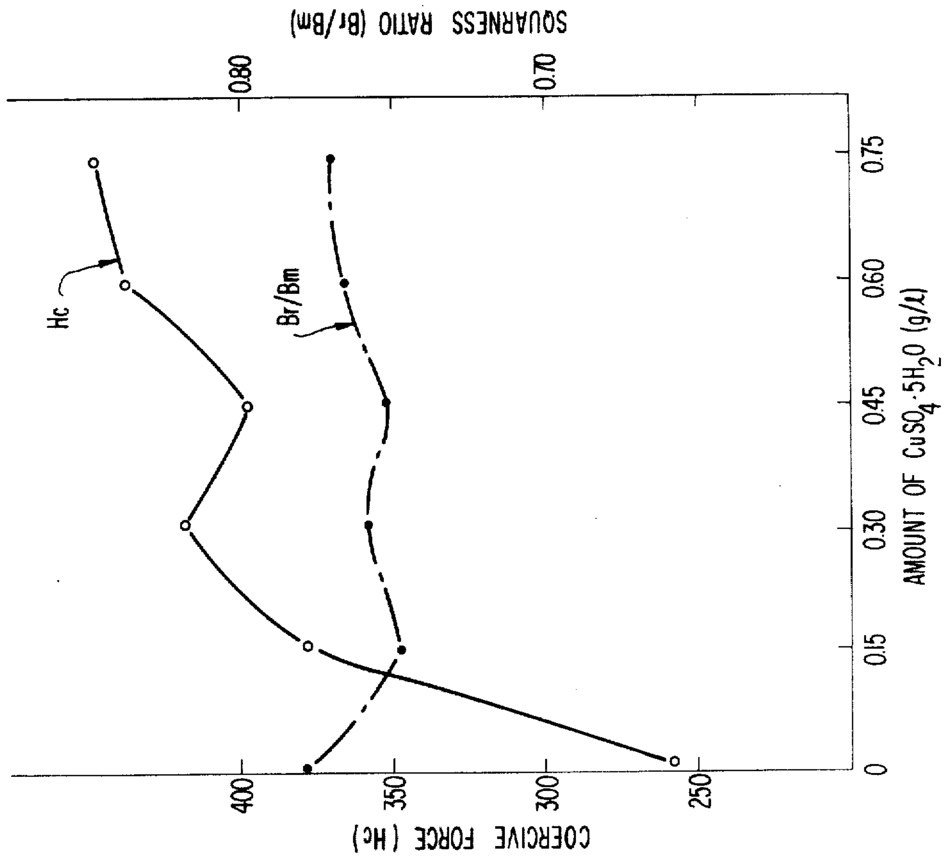

As described above, the desired magnetic properties necessary for increasing the magnetic recording density can be provided to a cobalt-nickel alloy type ferromagnetic layer formed by electroplating by adding copper and zinc to the ferromagnetic layer according to the present invention.

The composition of the ferromagnetic thin layer electroplating layer in accordance with this invention is as follows

| | | | | | |
|---|---|---|---|---|---|
| Co: | 30 – 90 | wt.%, | preferably | 60 – 90 | wt.% |
| Ni: | 70 – 10 | wt.%, | preferably | 10 – 30 | wt.% |
| Cu: | 0.01 – 5 | wt.%, | preferably | 0.05 – 3 | wt.% |
| Zn: | 0.01 – 5 | wt.% | preferably | 0.05 – 2 | wt.% |

The ferromagnetic thin layer can be produced in accordance with the techniques described in U.S. Pat. Nos. 3,489,661; and 3,227,635 using an electroplating bath of a concentration of 50 – 250 g/liter, preferably 80 – 150 g/liter, an electroplating bath temperature of 0° – 60°C, preferably 20° – 50°C, and a D.C. current density of 0.01 – 10 A/dm², preferably 0.03 – 5 A/dm² employing for the electroplating a support of a nonmagnetic metal, such as Al, Cu, Zn, Mg, or alloys thereof.

The effective features of the present invention will be shown by the following examples.

COMPARISON EXAMPLE 1

A pure copper base plate (impurities content being less than 0.01%) having an area of 7 cm × 14 cm and a thickness of 0.1 mm which was preliminarily degreased and washed sufficiently with water was plated in an electroplating bath having the following composition:

| (Composition of plating bath) | |
|---|---|
| Cobalt Sulfate | 30 g |
| Cobalt Chloride | 5 g |
| Nickel Sulfate | 30 g |
| Nickel Chloride | 5 g |
| Boric Acid | 7.5 g |
| 1,5-Naphthalenedisulfonic Acid | 1.5 g |
| Formaldehyde | 0.1 cc |
| Deionized Water | 1000 cc |

The temperature of the plating bath was 20°C and a nickel plate was used as the anode. The current density for the plating was 0.5 amp/dm² and the plating period of time was 3 minutes.

The electroplated layer thus formed was evaluated using a B-H tracer and the results shown in Table 1 were obtained.

Table 1

| Coercive Force (HC) | Squareness Ratio (Br/Bm) |
|---|---|
| 180 | 0.68 |

As is clear from the above results, an excellent coercive force and squareness ratio of the ferromagnetic film formed in the above process was not obtained. The above results are one example of the magnetic properties of a cobalt-nickel ferromagnetic layer formed by an electroplating method but the magnetic properties of the layer can be changed somewhat by varying the current density for the electroplating, the form of the current wave, and the plating period of time.

COMPARISON EXAMPLE 2

The copper base plate as in Comparison Example 1 was plated in an electroplating bath having the following composition under the plating conditions as described in Comparison Example 1.

| (Composition of plating bath) | |
|---|---|
| Cobalt Sulfate | 42 g |
| Cobalt Chloride | 7 g |
| Nickel Sulfate | 18 g |
| Nickel Chloride | 3 g |
| Boric Acid | 7.5 g |
| 1,5-Naphthalenedisulfonic Acid | 1.5 g |
| Formaldehyde | 0.1 cc |
| Deionized Water | 1000 cc |

The magnetic properties of the ferromagnetic layer thus formed are shown in the following table.

Table 2

| Coercive Force (Hc) | Squareness Ratio (Br/Bm) |
|---|---|
| 220 | 0.68 |

EXAMPLE 1

By adding 0.15 g of copper sulfate to the electroplating bath in Comparison Example 1, a plating bath having the following composition was obtained.

| (Composition of plating bath) | |
|---|---|
| Cobalt Sulfate | 30 g |
| Cobalt Chloride | 5 g |
| Nickel Sulfate | 30 g |
| Nickel Chloride | 5 g |
| Boric Acid | 7.5 g |
| 1,5-Naphthalenedisulfonic Acid | 1.5 g |
| Formaldehyde | 0.1 cc |
| Copper Sulfate | 0.15 g |
| Pure Water | 1000 cc |

Figure 1:
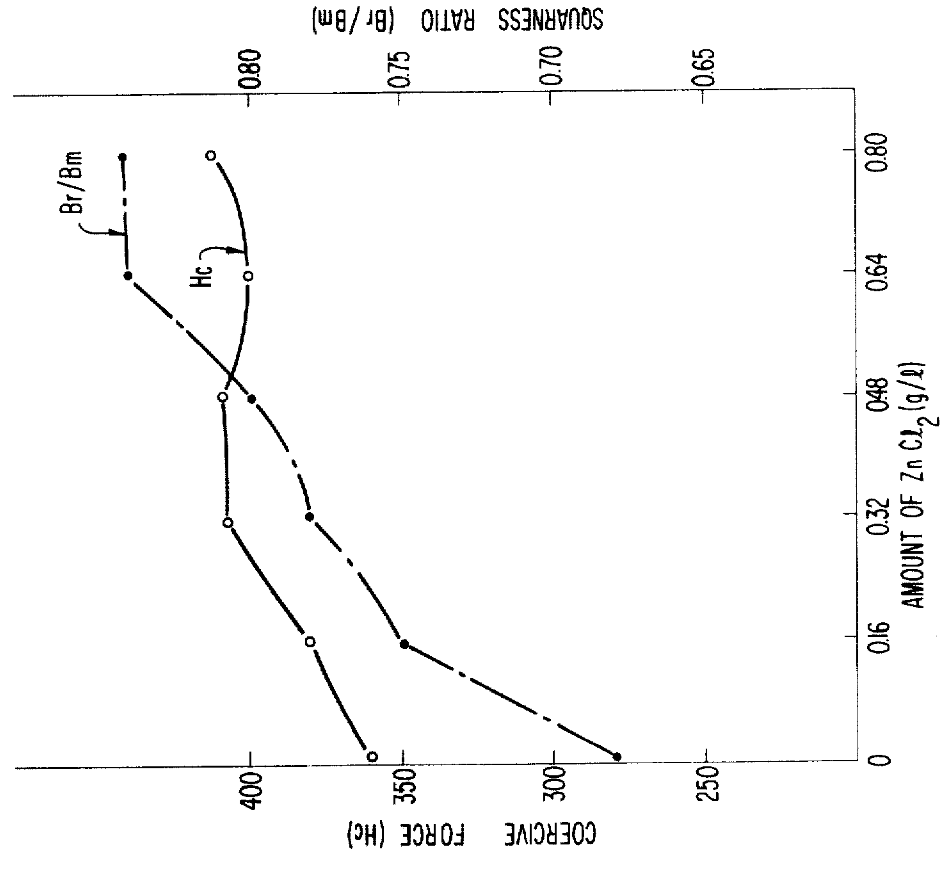

By using the copper base plate and the plating conditions as described in Comparison Example 1, the electroplating was conducted after adding further an appropriate amount (0 – 0.80 g/liter) of zinc chloride ($ZnCl_2$) to the plating bath and then the B-H characteristics of the ferromagnetic layers thus formed were measured, the results of which are shown graphically in FIG. 1 of the accompanying drawings.

As is clear from the results shown in FIG. 1, as compared with the results in Comparison Example 1, the coercive force was increased greatly by the addition of copper sulfate and also the square ratio (Br/Bm) was increased greatly by the addition of zinc chloride.

EXAMPLE 2

By adding 0.16 g of zinc chloride to the plating bath described in Comparison Example 1, a plating bath having the following composition was obtained.

| (Composition of plating bath) | |
|---|---|
| Cobalt Sulfate | 30 g |
| Cobalt Chloride | 5 g |
| Nickel Sulfate | 30 g |
| Nickel Chloride | 5 g |
| Boric Acid | 7.5 g |
| 1,5-Naphthalenedisulfonic Acid | 1.5 g |
| Formaldehyde | 0.1 cc |
| Zinc Chloride | 0.16 g |
| Pure Water | 1000 cc |

By using the copper base plate and the plating conditions as described in Comparison Example 1, the electroplating was conducted after adding an appropriate amount (0 – 0.75 g/liter) of copper sulfate ($CuSO_4.5H_2O$) to the plating bath and the magnetic properties of the ferromagnetic layer thus formed are shown in FIG. 2 of the accompanying drawings.

As is clear from the results contained in FIG. 2, the coercive force was increased greatly by the addition of copper and also the square ratio was excellent from the addition of zinc.

By considering the above results, it can be seen that the addition of copper alone has the effect of increasing the coercive force but the improvement of the Br/Bm ratio is insufficient, the addition of zinc alone has the effect of increasing the square ratio but the improvement of the Hc is insufficient. Furthermore, it can also be seen that with the addition of copper and zinc simultaneously, both the coercive force and the square ratio are improved to a greater extent than that obtained when copper or zinc is added alone. Thus, from the above examples it can be clearly understood that the present invention is quite effective.

EXAMPLE 3

Figure 3:
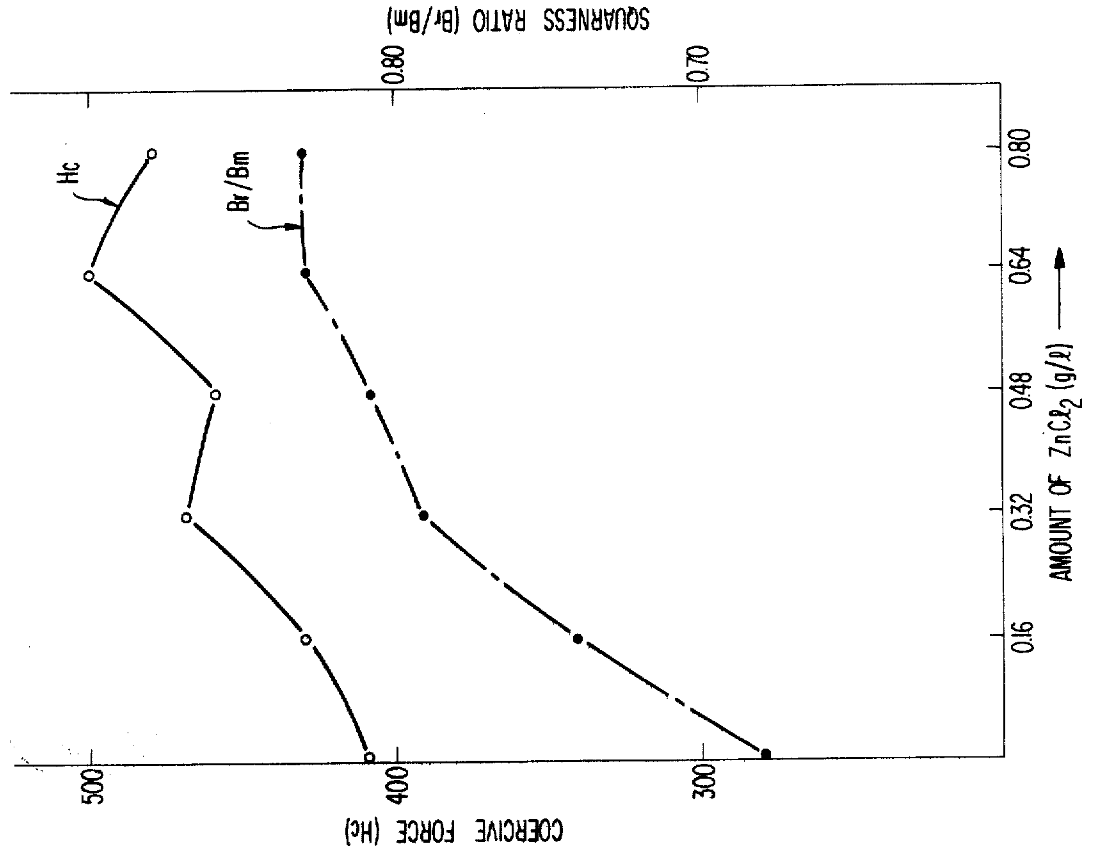

The same procedure as described in Comparison Example 2 were conducted using the same copper base plate and plating conditions as described in Comparison Example 2 while adding 0.15 g of copper sulfate ($CuSO_4,5H_2O$) and an appropriate amount (0 – 0.8 g/liter) of zinc chloride ($ZnCl_2$) to the plating bath in the example and a ferromagnetic layer having the magnetic properties as shown in FIG. 3 of the accompanying drawings was obtained.

From the results contained in FIG. 3, it was confirmed that the addition of copper and zinc to the plating bath containing cobalt and nickel was quite effective as compared with the results obtained in Comparison Example 2.

EXAMPLE 4

Figure 4:
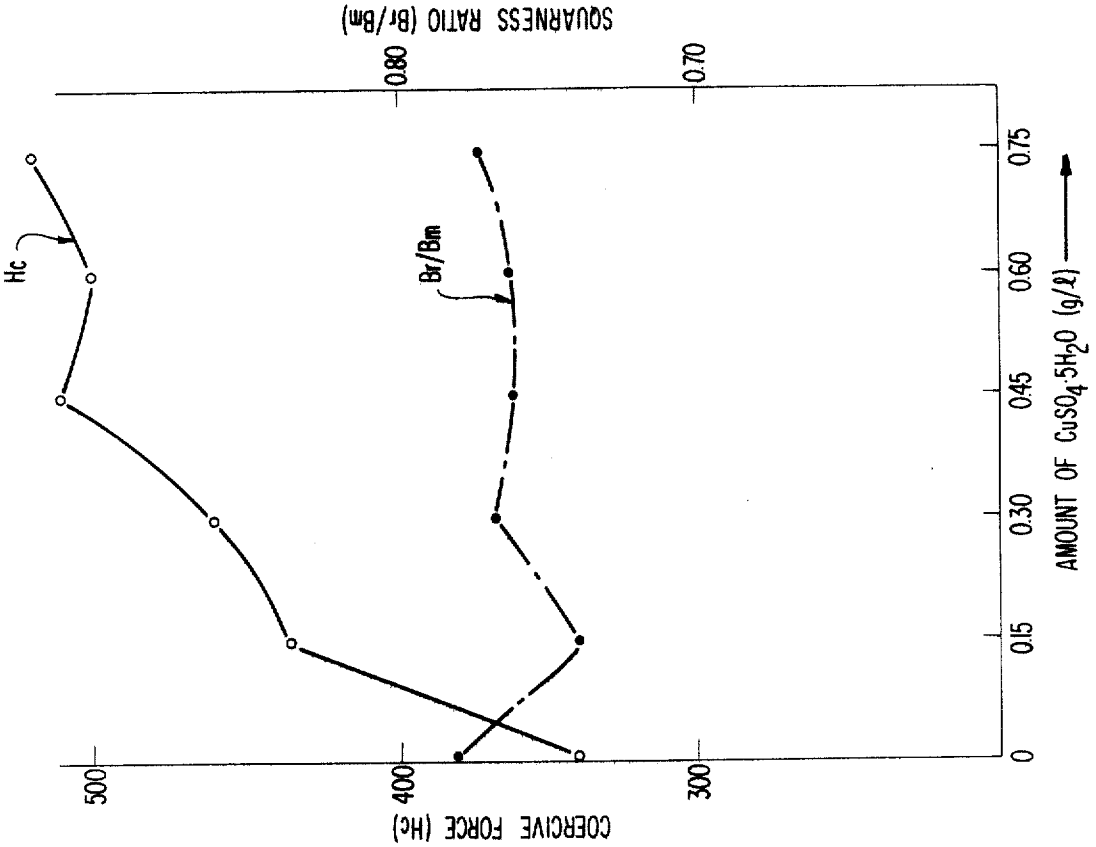

The same procedure as described in Comparison Example 2 was conducted using the same copper base plate and plating conditions as described in Comparison Example 2 while adding 0.16 g of zinc chloride ($ZnCl_2$) and an appropriate amount (0 – 0.75 g/liter) of copper sulfate ($CuSO_4.5H_2O$) to the plating bath as in Comparison Example 2 and the ferromagnetic films having the magnetic properties as shown in FIG. 4 were obtained. From the results shown in FIG. 4 it can be seen that by the addition of copper and zinc, the Br/Bm ratio was almost the same, within the range of experimental error, but the Hc was greatly improved as compared with the results obtained in Comparison Example 2. The above example also shows the effectiveness of the present invention.

Furthermore, by adding copper and zinc to a cobalt-nickel type ferromagnetic layer for improving the magnetic properties of the ferromagnetic layer according to the present invention, it has also been confirmed that the ferromagnetic layer has a satisfactory surface gloss which affects the reproducibility thereof and has less pin holes which cause dropout and noise of the magnetic recording medium, and thus the ferromagnetic thin layer of this invention is quite excellent as a magnetic recording medium.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon an electroplated ferromagnetic thin layer consisting essentially of from 90 to 99.98 wt.% of cobalt-nickel alloy based on 100 wt.% of said thin layer consisting of from 30 to 90 wt.% of cobalt and from 10 to 70 wt.% of nickel, and said ferromagnetic thin layer additionally containing from 0.01 to 5 wt.% of copper and from 0.01 to 5 wt.% of zinc.

2. The magnetic recording medium as set forth in claim 1, wherein said ferromagnetic layer comprises the electroplated product obtained using an electroplating bath containing 50 to 250 g/liter of the ions of cobalt, nickel, copper, and zinc, wherein said bath has a temperature of from about 0°C to 60°C, and wherein the electroplating employs a current density of from about 0.01 to 10 $A/dm^2$.

3. The magnetic recording medium as set forth in claim 1, wherein said cobalt-nickel alloys contains 60 to 90 wt.% of cobalt.

4. The magnetic recording medium as set forth in claim 1, wherein said cobalt-nickel alloy contains 10 to 30 wt.% nickel.

5. The magnetic recording medium as set forth in claim 1, wherein said thin layer contains 0.05 to 3 wt.% of copper.

6. The magnetic recording medium as set forth in claim 1, wherein said thin layer contains 0.05 to 2 wt.% of zinc.

* * * * *